D. BELCHER.
Detaching Horses.

No. 88,263. Patented March 30, 1869.

Witnesses:

Inventor:
Daniel Belcher
by his attorney

United States Patent Office.

DANIEL BELCHER, OF EASTON, ASSIGNOR TO HIMSELF AND ALVIN COLBURN, OF LYNN, MASSACHUSETTS.

Letters Patent No. 88,263, dated March 30, 1869.

IMPROVED MECHANISM FOR CONNECTING HORSES TO VEHICLES.

The Schedule referred to in these Letters Patent and making part of the same.

*To all persons to whom these presents may come:*

Be it known that I, DANIEL BELCHER, of Easton, in the county of Bristol, and State of Massachusetts, have invented a new and useful Improvement in Mechanism for Connecting a Horse to a Carriage; and do hereby declare the same to be fully described in the following specification, and represented in the accompanying drawings, of which—

Figure 1:
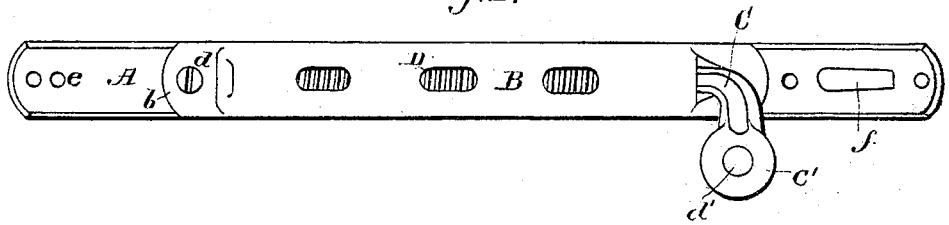
Figure 2:
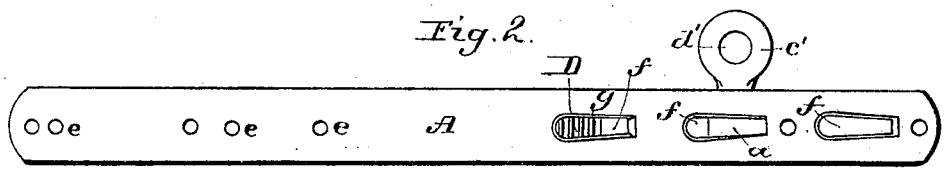
Figure 3:
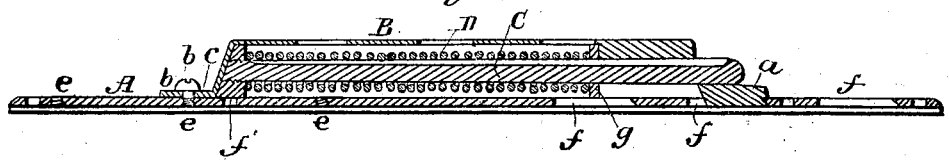

Figure 1 is a top view;

Figure 2, a bottom view;

Figure 3, a longitudinal section; and

Figure 4:
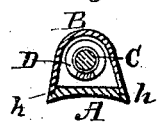

Figure 4, a transverse section of one of my adjustable connections.

This improvement has reference to the mechanism on which Letters Patent, No. 72,167, dated on or about December 17, A. D. 1867, were granted to Alvin Colburn and John Raddin, as assignees of Alvin Colburn and Elbridge G. Stanley, the inventors.

The improvement is for the purpose of effecting the ready adjustment of the spring connection-case on the shaft, so as to bring a horse, when between the shafts, and connected therewith, at a proper distance from the carriage-body, or the cross-bar of the thills.

It has been found, when the spring-case is permanently fixed to the shaft, that it will sometimes happen that a large horse, when harnessed to the thills, will be brought too near to the cross-bar thereof, and in consequence thereof, will be liable to strike the bar with his hind legs while he may be drawing a carriage, particularly when he may be in a fast movement. Therefore, it becomes very desirable to have the spring-case and its connection-bar so applied to the shaft as to be adjustable lengthwise thereof.

In the drawings—

B denotes the hollow case, which, in this instance, is not made so as to straddle the shaft, or with perforated ears, or projections to receive fastening-screws, to go into the shaft, but is formed with a hooked projection, $a$, to extend down from its front end; and it also has a flat ear, $b$, projecting from its rear end, and perforated with a hole, $c$, to receive a fastening-screw, $d$, which goes through the said ear and one of a series of screw-holes, $e\ e\ e$, made in a metallic bar, A, which is to be fastened to the shaft by screws going through the bar and into the shaft.

This bar is provided with a series of catch-holes, or slots, $f\ f\ f$, formed as represented, such holes being so arranged, with respect to the screw-holes $e\ e\ e$, that when the hooked projection $a$ is in either one of the said slots $f\ f\ f$, the hole in the ear $b$ shall come directly over one of the screw-holes $e\ e\ e$.

C is the bar which slides in and projects out of the spring-case.

This bar, at its front end, is bent at a right angle, and provided with a round head, $c'$, through which an eye, $d'$, is made.

A helical spring, D, encircles that part of the bar which is within the case.

At its rear end, the spring bears against a nut, or head, $f'$, fixed or screwed on the bar C.

The spring, at its front end, rests against a shoulder, or cross-partition, $g'$, arranged in the case.

The case may be made or provided with two lips, $h\ h$, to extend down from it, and embrace the plate, or bar A, on its opposite edges, which may be rebated to receive such lips.

The bar C, its spring, and case, with exceptions, as hereinbefore stated, are essentially like corresponding parts represented and described in the specification of the aforesaid patent, and are for the same purpose, and to be used in the same manner, and with other mechanism, as explained in such patent, my present improvement consisting in the combination of the spring-case and its bolt-receiving bar and their spring, with means or mechanism by which such case, with its spring and bolt-receiving bar, may be adjusted lengthwise to different positions on and fastened to the thill or shaft of a carriage, such adjustment being for the purpose of bringing a horse into proper relation with the body of the carriage or the cross-bar of the thills.

From the above, it will be seen that I make no claim to the bar C, the case B, and the spring D, as arranged and combined together, and used in manner as set forth in the patent hereinbefore mentioned; nor do I claim, when disconnected from such parts, the slotted bar, or plate A, the catch-hook $a$, and the clamp-screw $d$.

What I claim as my invention, is—

The combination of the slotted bar, or plate A, the catch-hook $a$, and the clamp-screw $d$, or equivalent devices, with the spring-case B, the bolt-receiving bar C, and the spring D thereof, the said slotted bar, catch-hook, and clamp-screw enabling the case B to be adjusted to and fixed in different positions on the shaft of a carriage, as and for the purpose hereinbefore explained.

DANIEL BELCHER.

Witnesses:
R. H. EDDY,
SAMUEL N. PIPER.